United States Patent
Park

(10) Patent No.: US 8,348,132 B2
(45) Date of Patent: Jan. 8, 2013

(54) MASK FRAME APPARATUS FOR MOUNTING SOLDER BALLS

(75) Inventor: Jong Won Park, Gyeongsangnam-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/067,851

(22) Filed: Jun. 29, 2011

(65) Prior Publication Data

US 2012/0000963 A1    Jan. 5, 2012

(30) Foreign Application Priority Data

Jul. 1, 2010  (KR) .................. 10-2010-0063317

(51) Int. Cl.
*B23K 1/00* (2006.01)

(52) U.S. Cl. ........................................ 228/41

(58) Field of Classification Search .......... 228/33, 228/246, 245, 180.22, 41, 248.1; 29/740, 29/840; 118/213

See application file for complete search history.

(56) References Cited

U.S. PATENT DOCUMENTS

| | | | | |
|---|---|---|---|---|
| 5,279,045 A * | 1/1994 | Odashima et al. | ............... | 34/360 |
| 5,918,792 A * | 7/1999 | Stumpe et al. | ................ | 228/41 |
| 6,390,351 B1 * | 5/2002 | Kasai et al. | ................ | 228/41 |
| 6,541,364 B2 * | 4/2003 | Mukuno et al. | ............... | 438/612 |
| 6,769,599 B1 * | 8/2004 | Momeni et al. | .......... | 228/180.22 |
| 6,869,008 B2 * | 3/2005 | Inoue et al. | ................ | 228/189 |
| 6,957,760 B2 * | 10/2005 | Cobbley et al. | ................ | 228/41 |
| 7,455,209 B2 * | 11/2008 | Bourrieres et al. | ............. | 228/41 |
| 7,597,233 B2 | 10/2009 | Sakaguchi et al. | | |
| 7,886,955 B2 * | 2/2011 | Kitamura | ................ | 228/41 |
| 8,001,683 B2 * | 8/2011 | Kawamura et al. | ............. | 29/843 |
| 2007/0130764 A1 * | 6/2007 | Nebashi et al. | ................ | 29/843 |
| 2008/0301935 A1 * | 12/2008 | Iida et al. | ................ | 29/843 |

FOREIGN PATENT DOCUMENTS

| | | |
|---|---|---|
| JP | 2002-141366 | 5/2002 |
| JP | 2007-220871 | 8/2007 |
| JP | 2009-10113 | 1/2009 |
| JP | 2009-32719 | 2/2009 |

OTHER PUBLICATIONS

Korean Office Action issued on Jul. 28, 2011 in corresponding Korean Patent Application No. 10-2010-0063317.
Korean Office Action mailed Mar. 2, 2012 issued in corresponding Korean Patent Application No. 10-2010-0063317.

* cited by examiner

*Primary Examiner* — Kiley Stoner
*Assistant Examiner* — Carlos Gamino

(57) ABSTRACT

Disclosed herein is a mask frame apparatus capable of forming a bump having a micro-pitch without performing the manufacturing and the operation controlling of a separate head apparatus and preventing the reduction of a mounting speed of solder balls due to the repetition of an operation of separately recovering the solder balls after they are mounted on a mask. A mask frame apparatus for mounting solder balls includes: an outer circumferential mask frame configured to supply solder balls and having a hollow type duct shape; and an inner mask duct having a duct shape and positioned over the inside of a circumference of the outer circumferential mask frame so as to be in communication with the outer circumferential mask frame, and including a plurality of mask openings formed in a duct shape bottom surface so that the solder balls introduced through the hollow type outer circumferential mask frame are mounted on a substrate by the flow of air.

2 Claims, 4 Drawing Sheets

FLUX PRINTING

- PRIOR ART -

SOLDER BALL MOUNTING

- PRIOR ART -

100

MASK FRAME APPARATUS FOR MOUNTING SOLDER BALLS

CROSS REFERENCE(S) TO RELATED APPLICATIONS

This application claims the benefit under 35 U.S.C. Section 119 of Korean Patent Application Serial No. 10-2010-0063317, entitled "Mask Frame Apparatus For Mounting Solder Balls" filed on Jul. 1, 2010, which is hereby incorporated by reference in its entirety into this application.

BACKGROUND OF THE INVENTION

1. Technical Field

The present invention relates to an apparatus for mounting solder balls on a plurality of connection pads.

2. Description of the Related Art

According to the related art, in order to form a solder bump on a connection pad for flip chip connection of a substrate such as a wafer, a circuit substrate, or the like, a solder paste has been screen printed and then has been subjected to a reflow process.

FIGS. 1A and 1B show a method for mounting solder balls according to the related art. According to the related art, a method in which flux is first allowed to be passed through a metal mask opening using a metal mask and a urethane squeegee to thereby be printed (See FIG. 1A), solder balls are mounted in a scheme in which they are positioned on the metal mask, are moved using a squeegee such as a metal wire, or the like, and dropped through the metal mask opening to thereby be seated on a pad having the flux applied thereto (See FIG. 1B), and bumps are then formed through a reflow process has been used.

However, in this method, an operation of separately recovering the solder balls after they are mounted on the mask is repeatedly performed, thereby causing reduction in a mounting speed of the solder balls.

Meanwhile, in accordance with the recent densification of semiconductor devices, a bump pitch having a micro-pitch of about 200 micron or 150 micron has also been required. When a solder paste is screen printed at the micro-pitch, a bridge between the bumps or an attachment of the solder paste to a printing mask occurs. Therefore, it has become difficult to form the solder bump at the micro-pitch by screen printing.

In order to solve this problem, methods of directly mounting solder balls on connection pads have been suggested as a method for forming the bump having the micro-pitch.

As one of the suggested methods, there may be a method of sucking and carrying solder balls using a suction jig and mounting the solder balls on connection pads, which is a method performed on connection pads for board mounting on an external connection terminal side of a ball grid array (BGA). Adhesive flux for soldering is previously applied to the connection pad, and the solder balls are attached and fixed to the connection pads by the adhesive flux. Then, the solder balls reflow to thereby form the bumps.

However, in this case, the solder ball has a large diameter of about 0.3 to 0.7 mm. It is necessary to allow solder balls for a micro-pitch to have a diameter of 100 micron or less. When the diameter of the solder balls becomes small as described above, aggregation occurs between the solder balls due to the action of static electricity or the solder balls may not be accurately sucked in a suction port of the suction jig due to the flow of air. Therefore, the suction port of the suction jig should also have a minute size, which causes an increase in a processing cost.

As another method suggested owing to this reason, there may be a method of mounting solder balls in openings of a mask disposed on a substrate using a head apparatus, which is a separate solder ball storing apparatus. That is, flux is first applied to a connection pad of the substrate and the connection pad and a metal mask are then arranged to and overlapped with each other. In this state, the solder balls drop from the head apparatus disposed over the metal mask onto the openings of the metal mask. An appropriate number of solder balls drop from the head apparatus, which is a separate container having an opening such as a slit, or the like, formed at the bottom thereof, on the mask. One solder ball drops onto each of the openings of the mask and is disposed on the connection pad arranged to the opening, such that it is attached and fixed to the connection pad by adhesive flux applied thereto.

In the method using the solder ball supplying head apparatus, the mask and a solder ball supplying head should necessarily have an interval of about a solder ball diameter or less maintained therebetween without being in contact with each other. However, in a method of maintaining an interval between the mask and the head as described, the solder ball is inserted therebetween, which causes deformation. Particularly, in the case of a circuit substrate such as a resin substrate, or the like, a bent degree thereof is large, and non-uniformity in thickness thereof is relatively large. Therefore, when a target substrate has a large size, it is very difficult to uniformly secure an interval between the mask and the head over the entire substrate, such that it is substantially impossible to avoid a problem that the solder ball is inserted between the mask and the head.

The manufacturing and the operation controlling of a separate head apparatus corresponding to the solder ball storing container may also impose a burden on users.

SUMMARY OF THE INVENTION

An object of the present invention is to provide a mask frame apparatus capable of forming a bump having a micro-pitch without performing the manufacturing and the operation controlling of a separate head apparatus.

Another object of the present invention is to provide a mask frame apparatus capable of preventing the reduction of a mounting speed of solder balls due to the repetition of an operation of separately recovering the solder balls after they are mounted on a mask.

Meanwhile, although a mask frame apparatus according to an exemplary embodiment of the present invention has been designed in consideration of the above-mentioned main objects, the present invention is necessarily limited thereto. It should be noted that the description of these specific objects does not exclude new objects or effects capable of being generated or predicted from a configuration of the present invention to be described below.

According to an exemplary embodiment of the present invention, there is provided a mask frame apparatus for mounting solder balls including: an outer circumferential mask frame configured to supply solder balls and having a hollow type duct shape; and an inner mask duct having a duct shape and positioned over the inside of a circumference of the outer circumferential mask frame so as to be in communication with the outer circumferential mask frame, and including a plurality of mask openings formed in a duct shaped bottom surface so that the solder balls introduced through the hollow type outer circumferential mask frame are mounted on a substrate by the flow of air.

The mask frame apparatus for mounting solder balls may further include an air supplying device configured to allow the solder balls to be movable to their mounted positions in the outer circumferential mask frame and the inner mask duct by the flow of air.

Solder balls that are not mounted on the substrate among the solder balls introduced into the inner mask duct may be recovered to the outer circumferential mask frame by the flow of air supplied by the air supplying device.

The outer circumferential mask frame may have a backward flow preventing slit configured therein so as to prevent the backward flow of the solder balls.

The inner mask duct may include two opening sides facing each other and the outer circumferential mask frame may include two openings formed at positions corresponding to those of the two opening sides of the inner mask duct and having the same size, such that the outer circumferential mask frame and the inner mask duct are in communication with each other through the two opening sides and the two openings.

A top surface of the inner mask duct may be configured to prevent the solder balls from leaving upwardly to the outside due to the flow of air.

The inner mask duct may include an air flow guide installed therein perpendicularly to the opening, wherein the air flow guide guides the flow of air in one direction.

DESCRIPTION OF THE PREFERRED EMBODIMENTS

Hereinafter, exemplary embodiments of the present invention will be described in detail with reference to the accompanying drawings so that those skilled in the art may easily practice the present invention.

Apparatus for Mounting Solder Balls

Before an apparatus for mounting solder balls according to an exemplary embodiment of the present invention is described in detail, it should be appreciated that an example of solder balls usable in the present invention may include a metallic solder ball such as a copper solder ball, a nickel solder ball, etc., a solder ball in which a soldering layer is formed on a surface of a core of a metallic solder ball such as a copper solder ball, a nickel solder ball, etc., a solder ball in which a soldering layer is formed on a surface of a core of a resinous solder ball, a solder ball in which a metal layer such as a copper layer, a nickel layer, etc., is formed on a surface of a core of a resinous solder ball, or the like, in addition to a solder ball for soldering; however, it is not limited thereto.

Figure 2:
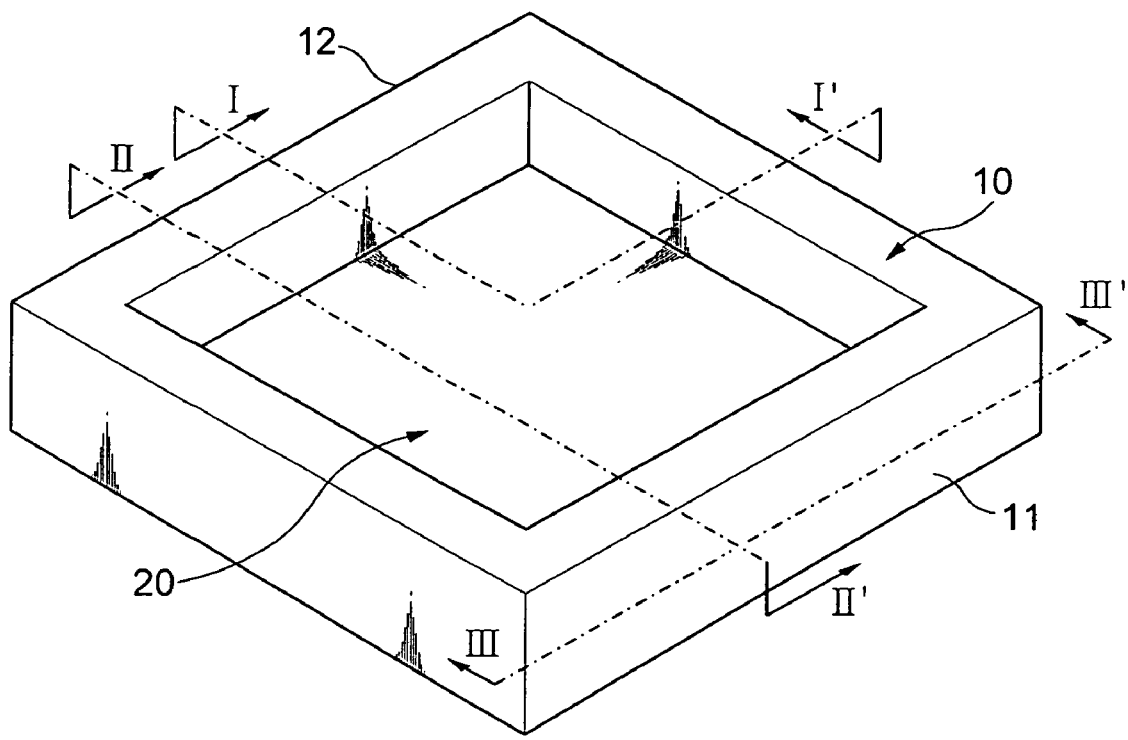
FIG. 2 is a view showing a mask frame apparatus for mounting solder balls according to an exemplary embodiment of the present invention.
Figure 3:
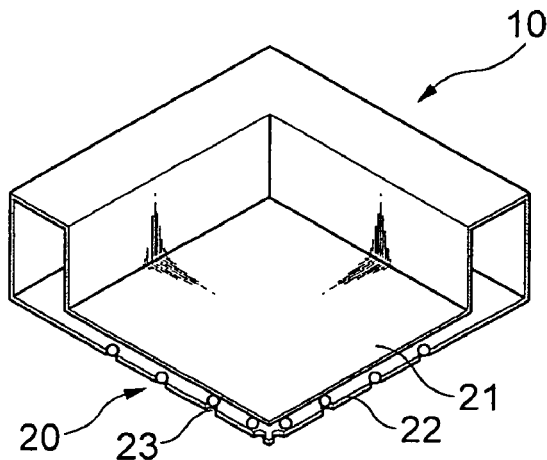
FIG. 3 is a cross-sectional view taken along the line I-I' of the apparatus shown in FIG. 2.

FIG. 2 is a view showing a mask frame apparatus 100 for mounting solder balls according to an exemplary embodiment of the present invention; FIGS. 3 to 4 is a cross-sectional view taken along the line I-I', the line II-II', and the line III-III' of the apparatus shown in FIG. 2, respectively.

As shown in FIG. 2, a mask frame apparatus 100 is mainly configured of an outer circumferential mask frame 10 installed on an outer circumferential portion thereof so as to have a frame shape and an inner mask duct 20 installed so as to be positioned in the outer circumferential mask frame.

The outer circumferential mask frame 10 serves as a path for supplying solder balls that are to be mounted and recovering solder balls that are not mounted among the supplied solder balls.

In order to perform this function, the outer circumferential mask frame 10 is formed as a hollow type frame having the entire rectangular shape and having a hollow central portion. That is, the outer circumferential mask frame 10 is configured to have a so-called frame shape in which a duct shaped pipe is formed only at a rectangular outer circumferential portion. The hollow central portion has the inner mask duct 20 to be described below mounted therein and coupled thereto.

The inner mask duct 20 serves as a guide moving the solder balls supplied or recovered through the outer circumferential mask frame 10 to pads on a substrate to which flux is applied and mounting them on the pad.

In order to perform this function, the inner mask duct 20 has a duct shape and is positioned over the inside of a circumference of the outer circumferential mask frame 10 so as to be in communication with the outer circumferential mask frame 10. Since the circumference of the outer circumferential mask frame 10 generally has a rectangular shape, the inner mask duct 20 is also configured to have a rectangular shape. More specifically, the duct having the above-mentioned shape may be manufactured by various methods.

The inner mask duct 20 has a plurality of mask openings 23 formed in a bottom surface 22 thereof so that the solder balls introduced through the hollow type outer circumferential mask frame 10 may drop on the substrate and be mounted thereon by the flow of air.

In addition, a top surface 21 of the inner mask duct 20 is configured to prevent the solder balls from leaving upwardly to the outside due to the flow of air supplied by an air supplying device to be described below. Since the solder balls passing through the outer circumferential mask frame 10 pass through an inside of the inner mask duct 20, a height (that is, a difference in heights between the top and bottom surfaces 21 and 22 of the inner mask duct 20) of a cross section of the inner mask duct 20 is preferably larger than a diameter of the solder ball in consideration of variables such as a bend of the substrate itself, etc.

The inner mask duct 20 may also have a plurality of partition walls (or guide units capable of providing the same function) selectively installed therein in a direction in which air is injected thereinto and flows therein.

Figure 6:
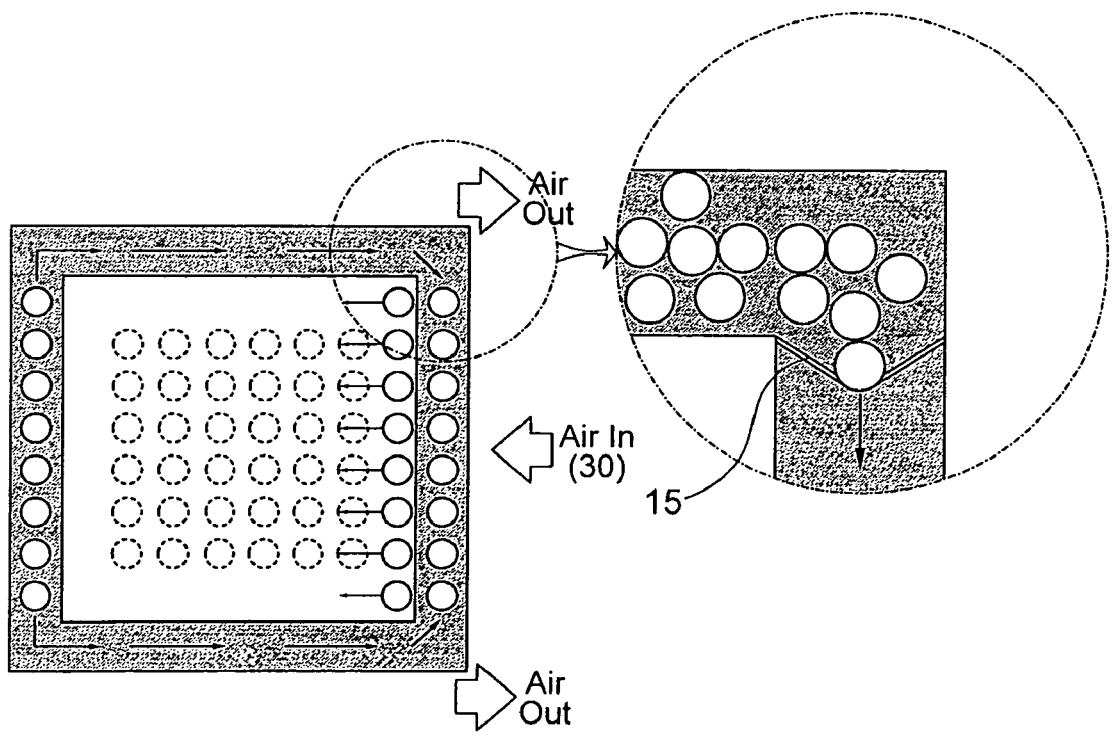
FIG. 6 is a view showing the flow of air for mounting solder balls on a substrate and a movement/recovery path of the solder ball according to an exemplary embodiment of the present invention.

Meanwhile, the solder balls may move in the outer circumferential mask frame 10 and the inner mask duct 20 by the flow of air supplied by the air supplying device 30 (See FIG. 6). Here, an air blower, or the like, generally used in the art may be used as the air supplying device. The air supplying device serves to recover the solder balls that are not mounted on the substrate among the introduced solder balls to the outer circumferential mask frame 10 as well as to allow the solder balls to be movable to their mounted positions in the outer circumferential mask frame 10 and the inner mask duct 20 by the flow of air.

Figure 4A:
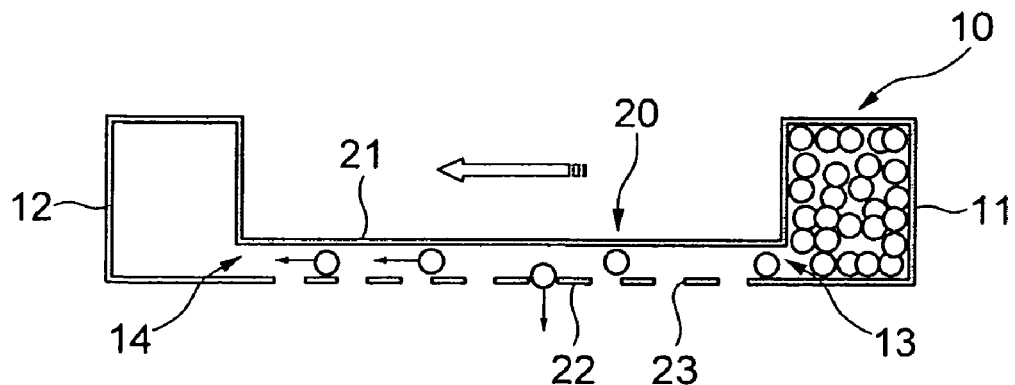
FIGS. 4A and 4B are cross-sectional views taken along the line II-II' and the line of the apparatus shown in FIG. 2, respectively.
Figure 4B:
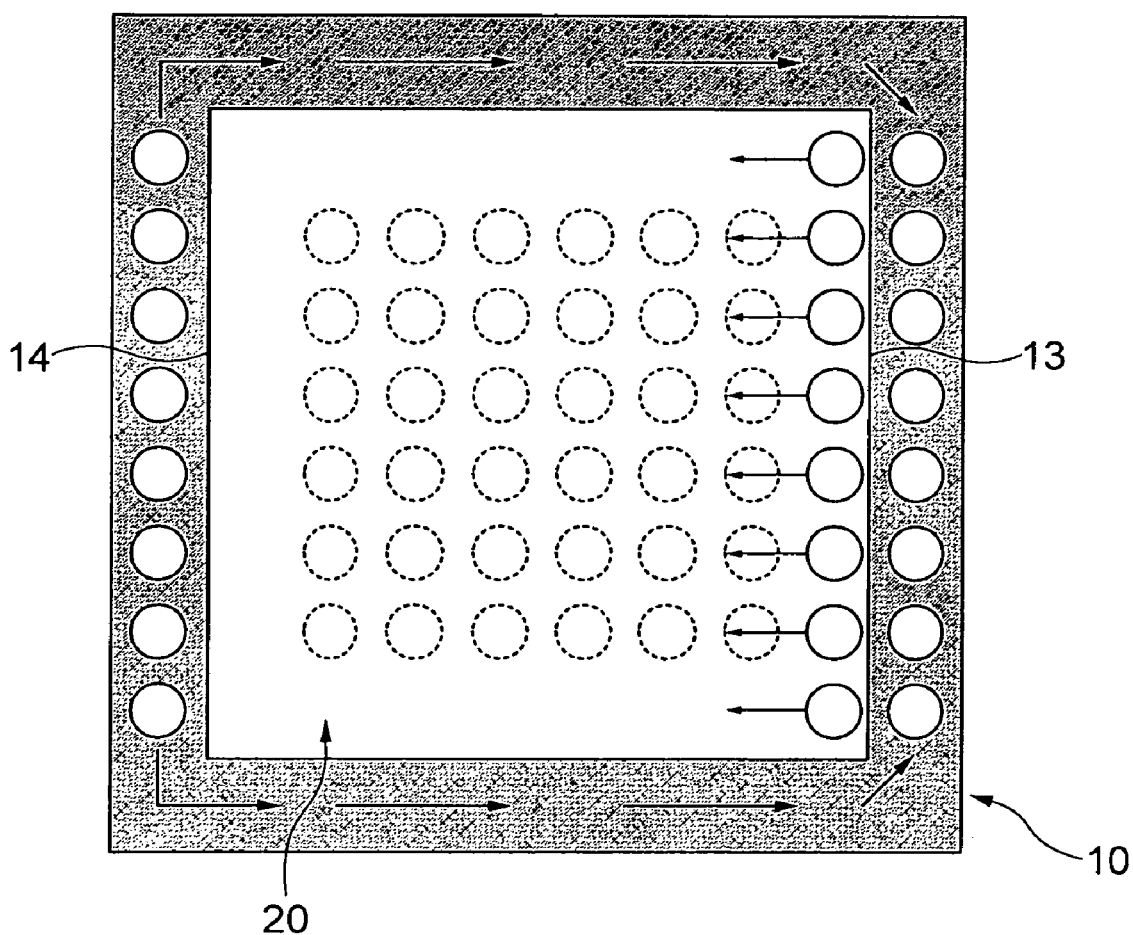

That is, the inner mask duct 20 is configured to include two opening sides facing each other, and the outer circumferential mask frame 10 is also configured to include two openings 13 and 14 formed at positions corresponding to those of the two opening sides of the inner mask duct 20 and having the same size, as shown in FIGS. 4A and 4B. The outer circumferential mask frame 10 and the inner mask duct 20 are in communication with each other through the two opening sides formed in the outer circumferential mask frame 10 and the two openings 13 and 14 formed in the inner mask duct 20.

In addition, as shown in FIG. 6, the outer circumferential mask frame 10 has a backward flow preventing slit 15 configured therein so as to prevent the backward flow of the solder balls. Particularly, the backward flow preventing slit 15 is preferably installed at a portion at which the solder balls are recovered, and may prevent the solder balls from flowing backwardly.

As a result, with the mask frame apparatus 100 for mounting solder balls according to the exemplary embodiment of the present invention, a bump having a micro-pitch may be formed without performing the manufacturing and the operation controlling of a separate head apparatus and the trouble of separately recovering the solder balls that are not mounted may also be prevented.

Method of Mounting Solder Balls

Hereinafter, a method of mounting solder balls on a substrate using the above-mentioned mask frame apparatus 100 for mounting solder balls according to the exemplary embodiment of the present invention will be described.

First, a substrate 200 including connection pads having adhesive flux applied thereto is prepared. Hereinafter, the substrate 200 is described as a circuit substrate; however, considering the spirit of the present invention, it is obvious that the substrate 200 may be a silicon wafer. Generally, the substrate may be a multi-layer circuit substrate in which a wiring layer and an insulating layer are stacked on both surfaces of a resinous core substrate having a through hole, etc., by a build-up process, etc. In the multi-layer circuit substrate, solder-resist layers are formed on both upper and lower surfaces of a multi-layer circuit part, and a plurality of connection pads arranged on the upper surface of the multi-layer circuit part are exposed to openings of the solder-resist layer. In addition, although each operation to be described below will describe a case in which the connection pads are arranged on only one side of the substrate for convenience of explanation, it may also be applied to a case in which the connection pads are arranged on both sides of the substrate.

Figure 1A:
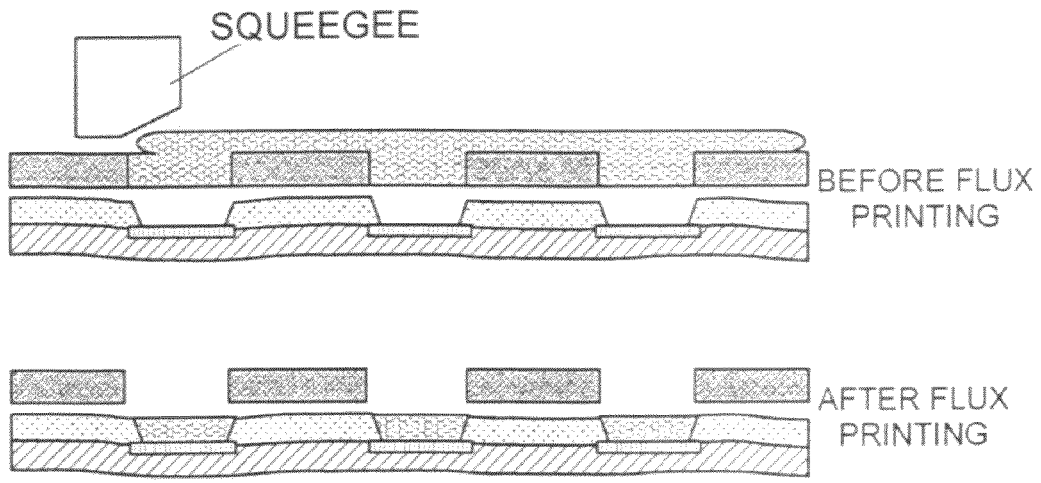
FIGS. 1A and 1B are views showing a method for mounting solder balls according to the related art.
Figure 1B:
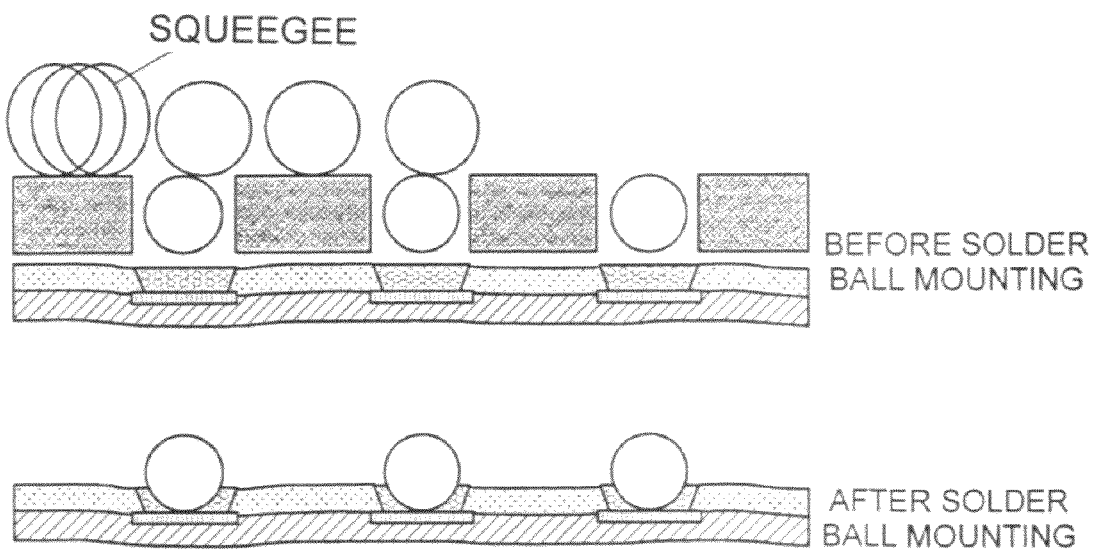

As shown in FIG. 1A, a mask for printing flux is arranged on a solder-resist layer. The mask for printing flux includes openings formed at positions corresponding to openings of the solder-resist layer. The openings of the mask for printing flux and the solder-resist layer are disposed to be arranged to each other, as shown in FIG. 1A.

Then, flux in a paste state is applied to an upper portion of the mask for printing flux and is moved to the openings of the mask by a squeegee to thereby flux layers on the connection pads in the openings of the solder-resist layer.

Next, when the mask for printing flux is removed, the flux is maintained in a state in which it is applied to only the connection pads in the openings of the solder-resist layer. Since the flux is adhesive, it may allow the solder balls disposed thereon to be attached and fixed thereto.

Although the present embodiment has described a case in which the flux is applied by printing using the mask, the present invention is not specifically limited thereto. The flux may be applied by any method that has been used to apply the flux to the connection pad according to the related art, such as a method using a dispenser, a method using transfer, a method using inkjet, or the like.

With respect to the substrate including the connection pad having the flux applied thereto by the method according to the related art, a method of arranging solder balls on connection pads by the above-mentioned mask frame apparatus 100 for mounting solder balls according to the exemplary embodiment of the present invention will be described with reference to FIGS. 5 and 6.

Figure 5:
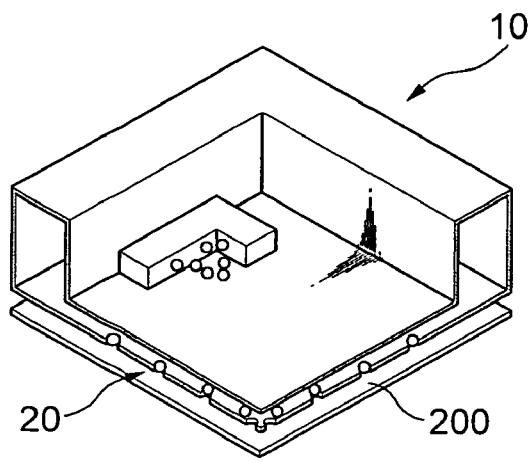
FIG. 5 is a view showing a method of mounting solder balls on a substrate by the mask frame apparatus for mounting solder balls according to an exemplary embodiment of the present invention.

The mask frame apparatus 100 for mounting solder balls shown in FIG. 2 is installed on the substrate including the connection pads having the flux applied thereto (See FIG. 5).

Then, the solder balls are supplied into the outer circumferential mask frame 10 of the mask frame apparatus 100. The solder balls are preferably supplied from a side 11 of the outer circumferential mask frame 10, which is a side having the air supplying device connected thereto.

Next, as shown in FIGS. 4 and 6, when the air is injected from the air supplying device into the outer circumferential mask frame 10, the solder balls in the outer circumferential mask frame 10 pass through a first side opening 13 of the outer circumferential mask frame 10 to thereby be moved into the inner mask duct 20 by the flow of the injected air. The solder balls moved into the inner mask duct 20 fall toward the electrode pads on the substrate by the mask openings 23 formed on a bottom surface 22 of the inner mask duct 20, and are fixedly mounted on the electrode pads by the flux.

The remaining solder balls except for the mounted solder balls pass through a second side opening 14 of the outer circumferential mask frame 10, which is an opening facing the first side opening 13, and then again enter the duct of the outer circumferential mask frame 10, by the flow of internal air. As a result, the remaining solder balls except for the mounted solder balls return to the outer circumferential mask frame 10 corresponding to their initial departure positions by the flow of air. This process may be repeated for a predetermined cycle.

Therefore, with the method for mounting solder balls according to the exemplary embodiment, the solder balls that are not mounted may be easily recovered, thereby making it possible to prevent the reduction in a mounting speed of the solder balls due to the repetition of an operation of separately recovering the solder balls after they are mounted on the mask.

Meanwhile, the plurality of partition walls (or guide units capable of providing the same function) are selectively installed in the inner mask duct 20 in a direction in which the air is injected and flows to stably guide the flow of air toward the mask openings 23, thereby making it possible to improve a mounting efficiency of the solder balls.

In addition, as shown in FIGS. 4A and 4B, the backward flow preventing slit 15 formed in the duct of the outer circumferential mask frame 10 prevents the solder balls from flowing backwardly, thereby making it possible to improve a mounting efficiency and a recovering efficiency of the solder balls.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

What is claimed is:

1. A mask frame apparatus for mounting solder balls comprising:
   an outer circumferential mask frame having a hollow typed duct shape with a feed opening and a recovery opening facing each other;
   an inner mask duct having a bottom surface with a plurality of mask openings having a top surface with a height larger than a diameter of the solder balls, and having a first opening connected to the feed opening and a second opening connected to the recovery opening; and
   an air supplying device configured to circulate the solder balls between the outer circumferential mask frame and the inner mask duct by air flow, thereby a feed and recovery of the solder balls are carried out at the same time,
   wherein a bottom surface of the outer circumference mask frame and the bottom surface of the inner mask duct are on the same flat plane.

2. The mask frame apparatus for mounting solder balls according to claim 1, wherein the outer circumferential mask frame has a backward flow preventing slit configured therein so as to prevent the backward flow of the solder balls.

* * * * *